United States Patent [19]

Koster et al.

[11] 4,309,147

[45] Jan. 5, 1982

[54] FOREIGN PARTICLE SEPARATOR

[75] Inventors: Walter E. Koster, Topsfield; William E. Ludke, Lynn; Frank A. Lastrina, Andover, all of Mass.

[73] Assignee: General Electric Company, Lynn, Mass.

[21] Appl. No.: 41,217

[22] Filed: May 21, 1979

[51] Int. Cl.³ .............................................. F01D 5/18
[52] U.S. Cl. .................................. 416/95; 415/121 A
[58] Field of Search ................. 415/115, 121 A, 168; 416/96, 97, 95

[56] References Cited

U.S. PATENT DOCUMENTS

| | | | |
|---|---|---|---|
| 2,292,291 | 8/1942 | Roe | 415/121 A |
| 2,632,626 | 3/1953 | McClintock | 415/116 |
| 2,807,434 | 9/1957 | Zimmerman | 416/97 R |
| 3,343,806 | 9/1967 | Bobo et al. | 415/175 |
| 3,356,340 | 12/1967 | Bobo | 415/115 |
| 3,501,900 | 3/1970 | Warner et al. | 415/121 A |
| 3,533,712 | 10/1970 | Kercher | 416/96 R |
| 3,575,528 | 4/1971 | Beam et al. | 416/97 X |
| 3,742,706 | 7/1973 | Klompas | 416/97 X |
| 3,918,835 | 11/1975 | Yamarik et al. | 416/97 R X |

FOREIGN PATENT DOCUMENTS

| | | | |
|---|---|---|---|
| 1016738 | 11/1952 | France | 416/96 R |
| 1194663 | 6/1970 | United Kingdom | 415/115 |

*Primary Examiner*—Everette A. Powell, Jr.
*Attorney, Agent, or Firm*—Henry J. Policinski; Derek P. Lawrence; Donald W. Walk

[57] ABSTRACT

A particle separator for the air cooling system of a gas turbine engine is provided in the form of a rotating chamber having an inlet disposed radially outward of the engine centerline at a distance greater than the distance of the chamber outlet from the engine centerline. The rotation of the chamber centrifuges foreign particles away from the chamber outlet to provide for separation of the particles from the air exiting the chamber.

4 Claims, 3 Drawing Figures

FOREIGN PARTICLE SEPARATOR

BACKGROUND OF THE INVENTION

This invention relates to particle separators and in particular to a particle separator for separating foreign material, such as sand, from a cooling air stream associated with the cooling system of a gas turbine engine.

Gas turbine engines, particularly those used to power aircraft, often must operate in an environment conducive to the entry of foreign particles into the inlet of the engine. In some environments, such as those associated with desert or sea coast areas, sand and other foreign particles from the ground may enter the engine during take-off, landing or hovering operation of the aircraft.

It is well known in the art to provide inlet particle separators disposed at the inlet portion of the engine to separate the foreign particles from the airstream and thereby to protect the components from the abrasive characteristics of the particles. However it has been found that, with the inlet particle separators known in the prior art, not all of the particles, particularly smaller particles such as fine sand, are removed from the airstream. While removal of most of the particles avoids erosion damage to the components of the engine, the presence of the smaller particles presents a problem with the cooling system associated with the engine. More particularly, since some of the air entering the engine inlet is drawn away from the main air stream and utilized to cool the turbine blades of the engine, foreign particles eventually are admitted to the cooling circuit associated with the turbine blades.

Since the cooling passages in the turbine blades are of extremely small diameter, the foreign particles tend to deposit within and clog the circuit passages in the blades. As a result, the amount of cooling air flowing through the passages is reduced and, in some instances, cooling flow is completely restrained if the passages are totally obstructed. Reduced or nonexistant cooling has a detrimental effect upon the life of the turbine blades during engine operation and hence, is a direct cause of high maintenance and replacement costs. This invention addresses the problem associated with clogging of the cooling circuit passages within the turbine blades by sand entrained in the cooling air flow.

SUMMARY OF THE INVENTION

Therefore, it is an object of the present invention to provide a particle separator for separating foreign particles from the stream of air associated with the cooling system for the turbine blades of a gas turbine engine.

Briefly stated, these and other objects, as well as advantages are accomplished by the present invention in which, in one form, provides a particle separator for a system for cooling a blade for a gas turbine engine wherein a flow path is adapted to receive pressurized air and to deliver the air to the blade. A rotating chamber is disposed in the flow path and is adapted to rotate about the engine center line. An inlet for introducing air into the chamber is disposed at a first radial distance from the engine centerline. Outlet means providing for the discharge of air from the chamber includes an entrance disposed at a second radial distance from the engine centerline. The second radial distance is less than the first radial distance such that particles of sand, or the like, do not enter the outlet means due to the centrifugal action of the rotating chamber.

DESCRIPTION OF THE DRAWINGS

While the specification concludes with claims distinctly claiming and particularly pointing out the invention described, the invention may be more readily understood by reference to the discussion below and the accompanying drawings in which:

DESCRIPTION OF THE PREFERRED EMBODIMENT

Figure 1:
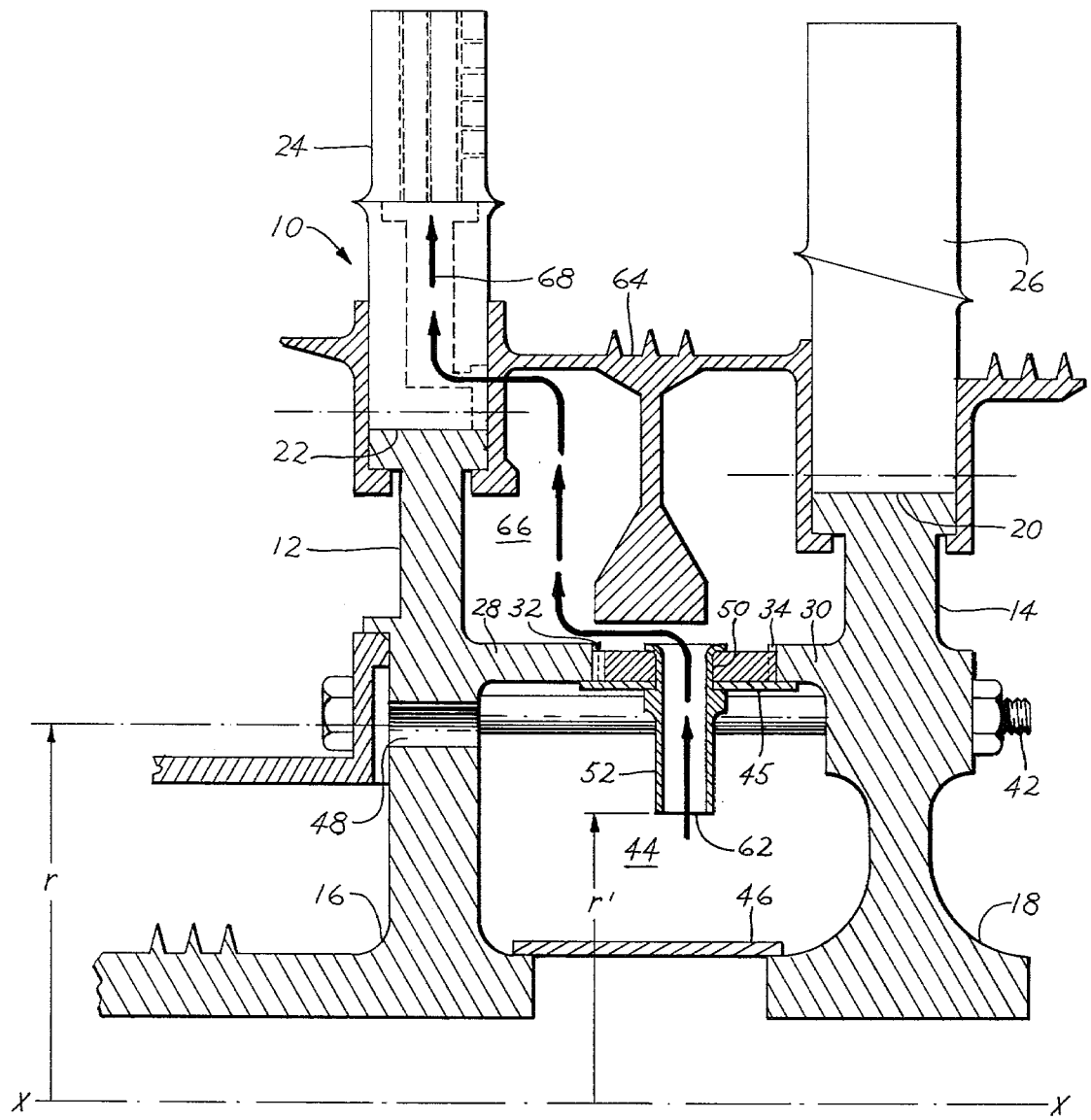
FIG. 1 is a schematic cross-sectional view of the present invention shown associated with blade and disc assemblies of a gas turbine engine.

Referring now to FIG. 1, which depicts a schematic cross-sectional view of the present invention, there is shown a turbine assembly depicted generally at 10 and adapted to rotate about an axis X—X which is the axial center line of the gas turbine engine. A description of the structure and operation of the gas turbine engine, to which the present invention is applicable, is not believed to be necessary since the structure and operation of the engine are well within the knowledge of one skilled in the art.

Turbine assembly 10 is comprised of a pair of axially spaced-apart turbine discs 12 and 14 each adapted to rotate about axis X—X and extending radially outward therefrom. For purposes of the description hereinafter to follow, the term radial shall mean a direction generally radial to the axis X—X the term "circumferential" shall mean a direction generally circumferential about the axis X—X and the term axial shall mean a direction generally along the X—X axis. Discs 12 and 14 include a radially inner most end 16 and 18, respectively, disposed closely adjacent the engine centerline X—X and a radially outermost end or periphery 22 and 20, respectively. A plurality of circumferentially spaced-apart turbine blades 24 are fixedly secured to the radially outer periphery 22 of disc 12 while a plurality of circumferentially spaced apart turbine blades 26 are fixedly secured to the radially outer periphery 20 of disc 14. Blades 24 and 26 are adapted to be disposed in the high velocity stream of the hot gases of combustion of the gas turbine engine. Coaction between the hot gas stream and the blades 24 and 26 provides the motive force to turn the turbine assembly 10 about the X—X axis.

Each turbine disc 12 and 14 includes a circumferentially extending flange 28 and 30 respectively projecting axially toward the other of the pair of discs 12, 14. Flange 28 is disposed intermediate radially inner end 16 and radially outer periphery 22 of disc 12 while flange 30 is disposed intermediate radially inner end 18 and radially outer periphery 20 of disc 14. Flanges 28 and 30 are provided with a plurality of teeth 32 and 34, respectively, projecting axially toward each other.

Figure 2:
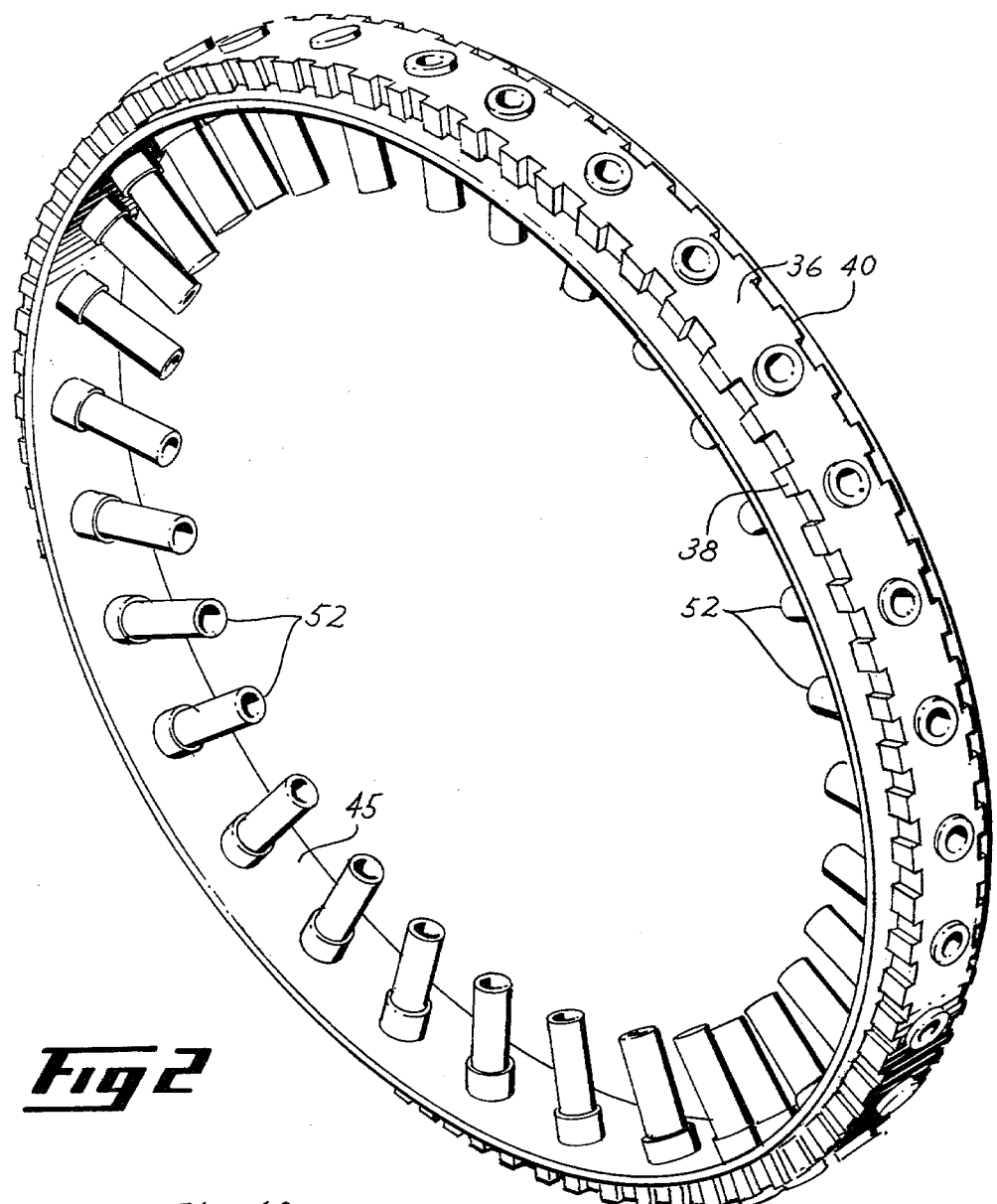
FIG. 2 is a perspective view of the torque ring assembly depicted in FIG. 1.

Referring now to FIG. 2 in conjunction with FIG. 1, a circumferentially extending torque ring 36 is disposed axially between flanges 28 and 30 and includes a plurality of axially projecting teeth 38 in interfitting mating engagement with teeth 32 of flange 28 and a plurality of axially projecting teeth 40 interfitting in mating engagement with teeth 34 of flange 30. Engagement of teeth 38 with teeth 32 and teeth 40 with teeth 34 effect a torque transmitting coupling whereby torque from disc 14 is transmitted to disc 12. Hence, by virture of the torque coupling, at the afore described first and second toothed interfaces discs 14 and 12 are fixed relative to one another and rotate as a unit about centerline X—X. Means, in the form of a plurality of bolt and nut assemblies 42 secure discs 12 and 14 and ring 36 in the aforestated fixed relationship with respect to one another.

A circumferentially and axially extending seal member 45 is imposed immediately adjacent torque ring 36 and axially overlaps flange teeth 32 and 34 and torque ring teeth 38 and 40. Seal member 45 prevents passage of air through the spaces between teeth 32 and 38 and between teeth 34 and 40.

It is observed that a chamber 44 is adapted to rotate about engine centerline X—X, is disposed between discs 12 and 14 radially inwardly of flanges 28 and 30. Hence, chamber 44 is bounded axially by discs 12 and 14. Furthermore, flanges 28 and 30 and torque ring 36 form an axially extending wall forming the radially outward boundary of chamber 44 such that chamber 44 is disposed radially inward of flanges 28 and 30. The radially inward boundary of chamber 44 is defined by an axially and circumferentially extending seal plate 46. In this manner, then, chamber 44 is fully enclosed. A plurality of axially extending inlets 48 (only one of which is shown) communicating chamber 44 with a source of pressurized air, such as the gas turbine engine compressor (not shown) extend axially through disc 12 at a first radial distance r from axial centerline X—X.

Figure 3:
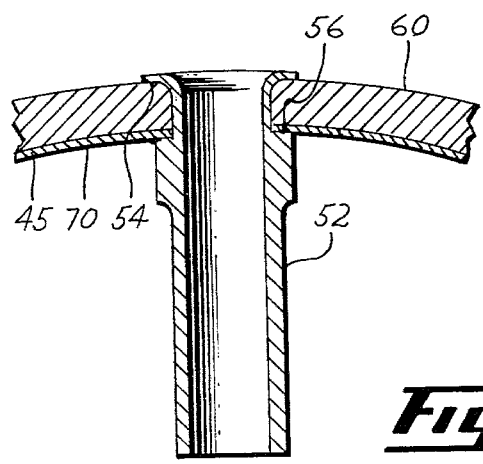
FIG. 3 is an enlarged cross-sectional view of a portion of the device illustrated in FIG. 1.

A plurality of spaced-apart radially extending mounting apertures 50 extend through torque ring 36 and seal member 45. A plurality of outlet means in the form of elongated hollow tubular 52 members are inserted in mounting apertures 50 for purposes hereinafter to be described. With reference to FIG. 3 in conjunction with FIG. 1, each tubular element or member 52 includes at its radially outer end first and second spaced-apart opposing shoulders 54 and 56, circumscribing the tubular member 52. Shoulder 54 disposed radially outward of ring 36 is adapted to abuttingly engage a radially outwardly facing surface 60 on ring 36 immediately adjacent mounting apertures 50. Shoulder 56 disposed radially inwardly on ring 36 is similarly adapted to engage a radially inwardly facing surface 70 on seal member 45 immediately adjacent mounting aperture 50. During assembly of tubular element 52 into mounting apertures 50, tubular element is entirely of cylindrical construction radially outward of shoulders 56 and shoulders 54 are not present. After tubular element 52 has been inserted into mounting aperture 50 the radially outermost end of tubular element 52 is expanded or swedged to produce shoulder 54 and abutment thereof with wall surface 60. In this manner, then, tubular elements 52 are retained fixed within mounting apertures 50.

Tubular elements 52 further include an entrance 62 at its most radially inward end. Entrance 62 is disposed at a radial distance r' from axial center line X—X. The radial distance r' is less than the radial distance r for purposes hereinafter to be described. Hence tubular element 52 is disposed such that its entrance 62 is positioned radially inward of inlet 48 and its outlet is disposed radially outward of inlet 48.

Spaced apart discs 12 and 14 further cooperate with a generally E-shaped seal member 64 to define a second chamber 66 disposed radially outward of flanges 28 and 30 and torque ring 36. Chamber 66 is in fluid communication with chamber 44 via tubular elements 52 and in fluid communication with a fluid circuit 68 in blade 24.

Hence, means have been provided for communicating pressurized air discharged from tubular members 52 to the cooling circuit in blades 24. It is observed that a flow path comprised of inlet 48, chamber 44, tubular element 52, chamber 66 and circuit 68 is defined for receiving pressurized air from a source of fluid pressure and for delivering the pressurized air to blades 24.

The structure heretofore defined is well adapted to achieve the objects previously stated. Cooling air, contaminated with foreign particles such as sand, is delivered from a source of fluid pressure such as the engine compressor (not shown) to the plurality of inlets 48. The contaminated air passes through inlet 48 into rotating chamber 44. Since discs 12 and 14 and chamber 44 are rotating at an extremely high velocity, the sand entrained in the cooling air is centrifuged radially outward toward flanges 28 and 30 and torque ring 36 and away from entrance 62 to hollow tubular element 52. Since entrance 62 to tubular elements 52 are disposed at a radial distance r' from engine centerline X—X which is less than the distance r of the inlets 48 from engine centerline X—X, the sand is centrifuged away from entrance 62 and prevented from entering entrance 62. Clean, uncontaminated air then enters entrance 62, flows sequentially through hollow tubular elements 52, cavity 66 and cooling circuit 68 to cool blade 24. Hence, by separating the sand from the cooling air in the manner described cooling of blades 24 may be effected without clogging of cooling circuit 68 and without reducing the life of blades 24 in the engine environment.

From the foregoing, it is now apparent that apparatus for separating foreign particles from cooling air used to cool turbine blades associated with a gas turbine engine has been described which is well adapted to fulfill the aforestated object of the invention and although only a single embodiment of the invention has been described for purposes of illustration, it will be apparent that other forms of the invention are apparent within the scope of the appended claims.

Having thus described the invention, what is claimed as new and useful and desired to be secured by U.S. Letters Patent is:

1. In a system for cooling a blade associated with a gas turbine engine wherein said blade is adapted to rotate about an engine centerline, the invention comprising:

a flow path receiving pressurized air and delivering said air to said blade;

a rotating chamber, disposed in said flow path and adapted to rotate about said centerline;

an inlet for introducing said air into said chamber, said inlet disposed at first radial distance from said centerline;

an outlet means providing for the discharge of said air from said chamber, said outlet means having an entrance disposed at a second radial distance from said centerline, said second radial distance being less than said first radial distance thereby utilizing centrifugal force to generally prevent foreign particles in said air from entering said outlet means; and a pair of turbine discs at least partially enclosing said chamber disposed therebetween, said chamber bounded by a radially outer most wall disposed radially outwardly of said inlet, said wall including an aperture, said outlet means comprising an elongated hollow tubular element mounted within said aperture, said element having an entrance disposed radially inward of said inlet and an exit disposed radially outward of said inlet.

2. In a system for cooling a blade associated with a gas turbine engine wherein said blade is adapted to rotate about an engine centerline, this invention comprising:

a pair of spaced-apart turbine discs adapted for rotation about said engine centerline, each of said discs including a flange extending axially toward the other of said discs;

a torque ring disposed between and engaging each of said flanges, said ring including a plurality of mounting apertures extending radially therethrough;

means for securing said ring and said discs in a fixed relationship with respect to one another;

a plurality of blades fixedly secured to one of said discs at the outer periphery thereof, each of said blades having a cooling circuit therein;

a rotating chamber disposed radially inward of said flanges and ring and at least partially bounded by said flanges and said ring and said disc;

a plurality of inlets extending axially through one of said discs for admitting pressurized cooling air into said chamber, said inlets disposed at a first radial distance from said centerline;

a plurality of elongated hollow tubular elements mounted in said mounting apertures in said ring, each of said tubular elements having an entrance disposed at a second radial distance from said centerline, said second radial distance being less than said first radial distance thereby utilizing centrifugal force to generally prevent foreign particles in said cooling air from entering said tubular element entrances, each of said tubular elements further having an exit disposed radially outward of said first radial distance; and means for communicating pressurized air discharged from said tubular members to said cooling circuit in said blades.

3. The invention as set forth in claim 2 further comprising a seal member disposed immediately adjacent and radially inward of said torque ring, said torque ring engaging said flanges at first and second toothed interfaces, said seal member axially overlapping said interfaces.

4. The invention as set forth in claim 3 further comprising: a radially inwardly facing surface on said seal member immediately adjacent said mounting aperture; a radially outwardly facing surface on said torque ring immediately adjacent said mounting aperture; first shoulder means disposed on said tubular member is abutting engagement with said radially inwardly facing surface; second shoulder means disposed on said tubular member in abutting engagement with said radially outwardly facing surface.

* * * * *

UNITED STATES PATENT AND TRADEMARK OFFICE
CERTIFICATE OF CORRECTION

PATENT NO. : 4,309,147
DATED : Jan. 5, 1982
INVENTOR(S) : Walter E. Koster, William E. Ludke, Frank A. Lastrina It is certified that error appears in the above-identified patent and that said Letters Patent are hereby corrected as shown below:

Column 6, line 23, delete the word "is" and insert in place thereof the word -- in -- .

Signed and Sealed this

Twenty-third Day of March 1982

[SEAL]

Attest:

GERALD J. MOSSINGHOFF

Attesting Officer

Commissioner of Patents and Trademarks